United States Patent Office 2,933,537
Patented Apr. 19, 1960

2,933,537

METHOD OF PRODUCING MIXTURES OF BIS (METHYLCYCLOPENTADIENYL) MAGNESIUM AND BIS (CYCLOPENTADIENYL) MAGNESIUM

William A. Barber, Springdale, Conn., assignor to American Cyanamid Company, New York, N.Y., a corporation of Maine No Drawing. Application February 28, 1958
Serial No. 718,131

8 Claims. (Cl. 260—665)

This invention relates broadly to a method of producing organometallic mixtures, and more particularly to a method of preparing a mixture of bis(lower alkyl-substituted cyclopentadienyl)magnesium and bis(cyclopentadienyl)magnesium.

In my Patent No. 2,788,377, dated April 9, 1957, I have disclosed and claimed the method of preparing dicyclopentadienylmagnesium [bis(cyclopentadienyl)magnesium] which comprises reacting, at a temperature of at least about 450° C., (1) a metal comprising magnesium with (2) at least one member of the class consisting of cyclopentadiene and substances engendering cyclopentadiene.

The present invention is based on my discovery that, when a procedure and reaction conditions somewhat similar to those disclosed in my aforementioned patent were used in a reaction between (1) a lower alkyl-substituted cyclopentadiene, specifically methylcyclopentadiene, and (2) a metal comprising magnesium, there was surprisingly obtained a mixture of bis(methylcyclopentadienyl)magnesium and bis(cyclopentadienyl)magnesium instead of bis(methylcyclopentadienyl)magnesium alone as normally would have been expected.

In practicing the present invention the reaction is effected at a temperature of at least about 450° C., and may range, for instance, between about 450° C. and about 700° C., depending, for example, upon the particular lower alkyl-substituted cyclopentadiene which is reacted with magnesium (metallic magnesium) to produce the aforesaid organometallic mixture; flow rate of the organic reactant; and other influencing factors. For instance, the reaction between magnesium and gaseous methylcyclopentadiene is preferably effected at a temperature of between about 450° C. and about 600° C. The maximum temperature of reaction in the case of the other lower alkyl-substituted cyclopentadiene reactants [e.g., dimethylcyclopentadiene, trimethylcyclopentadiene, tetramethylcyclopentadiene, etc., and the mono- and poly- (e.g., di-, tri-, tetra-, etc.) ethyl-, propyl-, isopropyl-, n-butyl-, isobutyl-, sec.-butyl-, tert.-butyl-, n-amyl-, isoamyl-, etc., cyclopentadienes] will normally be a little lower than the maximum temperature used when methylcyclopentadiene is the reactant. In general, the reaction is carried out at the lowest possible temperature which is consistent with optimum yields and minimum deposition of carbon in the reaction zone.

The reaction is preferably effected while at least the lower alkyl-substituted cyclopentadiene is in gaseous state. However, liquid-phase reactions are not precluded, in which case superatmospheric pressure is used when necessary in order to keep the organic reactant in the liquid state at the desired temperature. Also, metallic or other catalysts may be employed to accelerate the reaction. If desired, the reaction may be effected in the presence of an inert gas (that is, one which is inert both to the reactants and to the reaction product, e.g., nitrogen, helium, argon and krypton) thereby to provide, for example, better control of the reaction. Such a gas also may serve as a carrier for, or diluent of, the organic reactant. It also aids in removing the mixture of bis(lower alkyl-substituted cyclopentadienyl)magnesium and bis(cyclopentadienyl)magnesium from the reaction zone.

Instead of magnesium one can use an alloy of magnesium, e.g., a magnesium-aluminum alloy. Alloys of magnesium with a metallic catalyst for the reaction can be used. Instead of a single lower alkyl-substituted cyclopentadiene alone, one can use mixtures thereof in any proportions.

It was quite surprising and unexpected that a mixture of a bis(lower alkyl-substituted cyclopentadienyl)magnesium and bis(cyclopentadienyl)magnesium could be produced by the method of this invention, especially since efforts to produce the corresponding bis(cyclopentadienyl) derivatives of other metals, specifically barium, aluminum, tin, zinc, uranium, cobalt, nickel and titanium by direct reaction with cyclopentadiene at elevated temperatures were unsuccessful (reference: Patent No. 2,788,377, column 2, lines 1–5).

In order that those skilled in the art may better understand how the present invention can be carried into effect, the following examples are given by way of illustration and not by way of limitation. All parts and percentages are by weight unless otherwise stated.

*Example 1*

Approximately 4.4 grams of magnesium metal powder are weighed into an open porcelain vessel, which is then placed inside a 1¼" diameter Vycor tube mounted horizontally in an electrically-heated furnace. Suitable connections are provided at both ends of the tube for introducing the vapor of methylcyclopentadiene and removing the reaction product and exit gases without exposure to the atmosphere.

The methylcyclopentadiene monomer is generated at the time of use by cracking the commercial dimer of methylcyclopentadiene in a reaction vessel provided with a column filled with glass beads; the cracking is continued at such a rate that the temperature at the top of the column remains at about 73° C., which is the boiling point of monomeric methylcyclopentadiene. From the top of the column, the methylcyclopentadiene vapor is mixed with a stream of an inert gas, specifically nitrogen, and the mixture is passed directly into the furnace. Suitable means are provided for controlling and measuring the temperature in the furnace.

At a temperature of about 500° C., a yellow liquid condensate deposits on the walls of the tube outside the furnace. This liquid is subsequently identified as a mixture of bis(methylcyclopentadienyl)magnesium and bis(cyclopentadienyl)magnesium dissolved in unreacted monomer. At higher temperatures (e.g., at about 600° C. and higher), the formation of the mixture is more rapid but contamination of the product with organic material is more likely to take place at such higher temperatures.

The reaction product is obtained as a yellow liquid which contains unreacted hydrocarbon and a mixture of substituted and unsubstituted cyclopentadienyl magnesium compounds. This mixture reacts rapidly with water to give both methylcyclopentadiene and cyclopentadiene (identified by mass spectroscopy). The mixture described above reacts rapidly with oxygen, but can be kept indefinitely if held under an inert atmosphere. This mixture (a liquid at room temperature) can be conveniently handled and transferred or may be dissolved in a suitable solvent for further use.

*Example 2*

Same as Example 1 with the exception that the magnesium metal is in the form of magnesium turnings which are supported in a vertical furnace above a disc of Nichrome gauze. The bed of turnings is heated by an electrical furnace to 525° C. The reaction temperature may be conveniently measured by means of a thermocouple placed in a thermocouple-well located at the center of the column of magnesium turnings.

A stream of methylcyclopentadiene vapor, produced as is described in Example 1, is passed down through the heated column of magnesium turnings. This vapor combines with the hot magnesium to produce a yellow liquid mixture containing bis(cyclopentadienyl)magnesium and bis(methylcyclopentadienyl)magnesium. This liquid condenses on the cooler walls of the furnace tube, and falls into a receiver below the furnace. The product can then be used as produced, or refined and separated for various applications. The product obtained is essentially a solution in unreacted monomer of a mixture of cyclopentadienyl magnesium compounds containing (in the example described here) at least 25% by weight of methyl-substituted bis(cyclopentadienyl)magnesium and not more than 75% unsubstituted bis(cyclopentadienyl)magnesium.

The composition of the mixture of this example (and of others produced by the method of this invention) depends on the conditions under which the process is carried out; higher temperatures and longer residence time produce more unsubstituted compound and less unreacted monomer, while lower temperatures and shorter residence time produce more of the lower alkyl-substituted, specifically methyl-substituted, derivative and more unreacted monomer. The composition of the mixture can be varied, as may be desired or required, by varying such influencing factors as, for instance, the temperature of the reaction, the flow rate of the lower alkyl-substituted cyclopentadiene, the flow rate of the inert carrier gas (if used) and the state of subdivision of the metal comprising magnesium.

*Example 3*

Same as in Example 1 with the exception that the organic reactant is ethylcyclopentadiene monomer, and the maximum temperature of reaction is about 600° C., the major portion of the reaction being caused to take place within the temperature range of from about 475° C. to about 550° C. The product, which is collected as in Example 1, comprises a mixture of bis(ethylcyclopentadienyl)magnesium and bis(cyclopentadienyl)magnesium.

*Example 4*

Same as in Example 1 with the exception that the organic reactant is propylcyclopentadiene monomer, and the maximum temperature of reaction is about 600° C., the major portion of the reaction being caused to take place within the temperature range of from about 475° C. to about 550° C. The product, which is collected as in Example 1, comprises a mixture of bis (propylcyclopentadienyl)magnesium and bis(cyclopendadienyl)magnesium.

Instead of methyl-, ethyl- or propylcyclopentadiene monomer specifically employed in the foregoing examples, one can use any other mono- or poly-(lower alkyl-substituted)cyclopentadiene, or mixtures thereof in any proportions, numerous examples of which have been given in the portion of this specification prior to the examples.

*Example 5*

Ethylene gas, from which a polymer is to be made by high-pressure polymerization technique, and which contains an objectionably high amount of oxygen when the gas is to be used for this purpose, is bubbled through a 5% solution of about equal parts by weight of bis-(methylcyclopentadienyl)magnesium and bis(cyclopentadienyl)magnesium in purified tetrahydrofuran at 10° C., using a closed system. After passage through the aforesaid solution, the oxygen content of the ethylene is sufficiently reduced so that the ethylene can be successfully polymerized under high pressure.

In addition to their use as an oxygen scavenger, mixtures of bis(lower alkyl-substituted cyclopentadienyl)magnesium and bis(cyclopentadienyl)magnesium are also useful as an intermediate in chemical reactions, e.g., as a reactant with carbon dioxide to yield salts of a mixture of dicyclopentadiene dicarboxylic acids; as a reactant with metallic salts (e. g., metallic halides such, for instance, as $FeCl_2$, $NiCl_2$, $MnCl_2$, etc.) to yield a mixture of unsubstituted and lower alkyl-substituted cyclopentadienyl metal compounds that can be separated from each other by conventional methods; as hypergolic agents; etc.

It is possible that, in addition to bis(lower alkyl-substituted cyclopentadienyl)magnesium and bis(cyclopentadienyl)magnesium, the mixtures of the present invention also contain so-called "mixed" compounds, that is, cyclopentadienylmagnesium compounds wherein a lower alkyl group, e.g., the methyl group, is substituted on only one ring. However, the presence of such a compound in the mixture is difficult to establish conclusively.

I claim:

1. The method of preparing a mixture of a bis-(lower alkyl-substituted cyclopentadienyl)magnesium and bis-(cyclopentadienyl)magnesium which comprises reacting, at a temperature of at least about 450° C., (1) a metal comprising magnesium with (2) a lower alkyl-substituted cyclopentadiene; and collecting the product comprising the aforesaid mixture.

2. A method as in claim 1 wherein the reactant of (2) is in a gaseous state.

3. A method as in claim 1 wherein the reaction is effected in the presence of an inert gas.

4. The method of preparing a mixture of bis(methylcyclopentadienyl)magnesium and bis(cyclopentadienyl)-magnesium which comprises reacting, at a temperature of at least about 450° C., (1) a metal comprising magnesium with (2) methylcyclopentadiene; and collecting the product comprising the aforesaid mixture.

5. A method as in claim 4 wherein the reactant of (2) is in a gaseous state.

6. A method as in claim 4 wherein the reaction is effected in the presence of an inert gas.

7. The method of preparing a mixture of bis(methylcyclopentadienyl)magnesium and bis(cyclopentadienyl)-magnesium which comprises reacting together magnesium and gaseous methylcyclopentadiene, said reaction being effected at a temperature of between about 450° C. and about 600° C.; and collecting the product comprising the aforesaid mixture.

8. A method as in claim 7 wherein the reaction is effected in the presence of an inert gas.

References Cited in the file of this patent

UNITED STATES PATENTS

| | | |
|---|---|---|
| 2,788,377 | Barber | Apr. 9, 1957 |
| 2,848,506 | Breslow | Aug. 19, 1958 |